Patented Feb. 28, 1928.

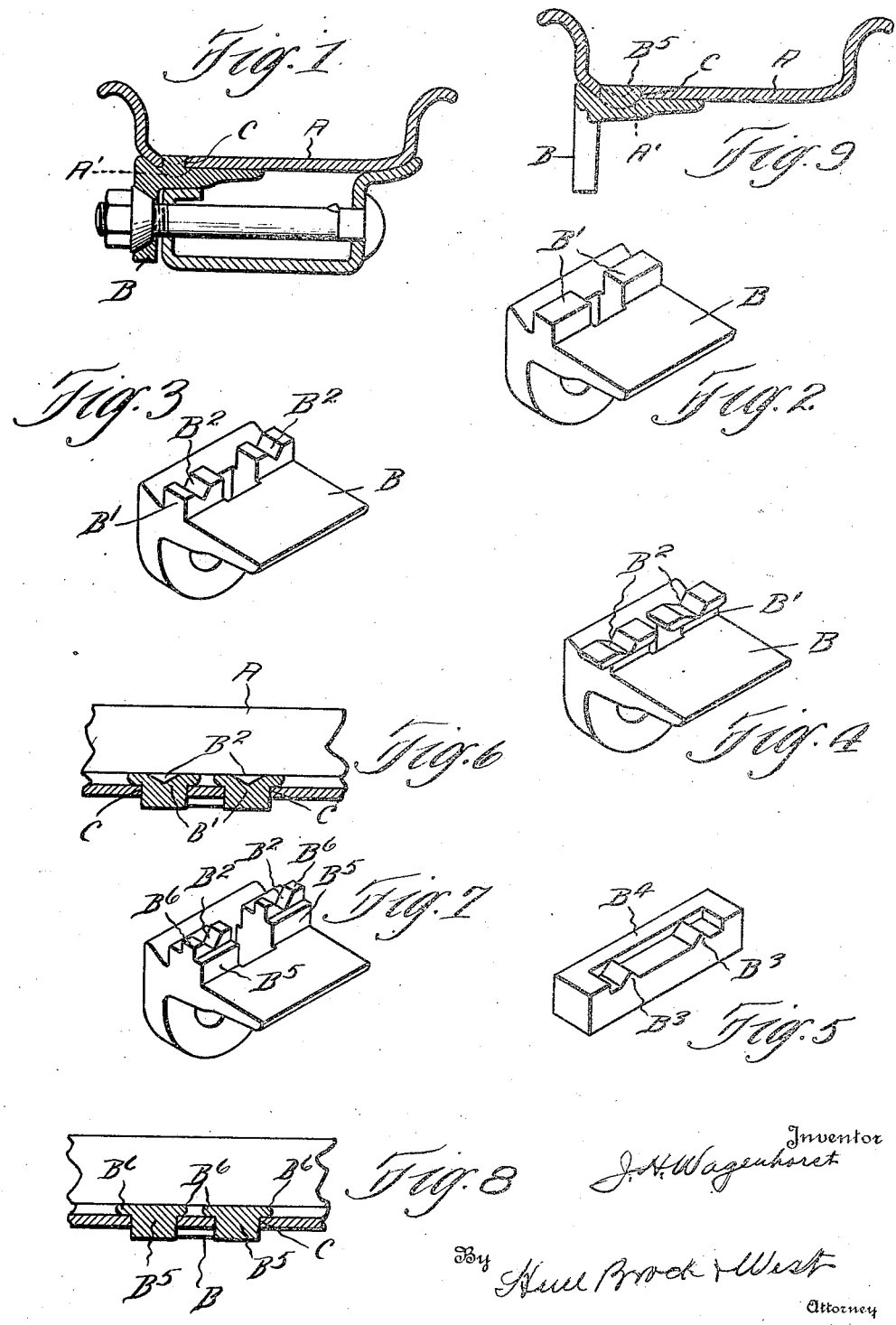

UNITED STATES PATENT OFFICE.

JAMES H. WAGENHORST, OF JACKSON, MICHIGAN.

METHOD OF MAKING TIRE RIMS WITH ATTACHED LUGS.

Application filed April 19, 1923. Serial No. 633,123.

This invention relates generally to demountable tire carrying rims and more particularly to an improvement upon the method of making the rim and fastening means described and claimed in my application filed January 20, 1923, Serial No. 613,835.

The present object is to provide a simple, economical and efficient method of making the rim and fastening means and another object is to so shape or form the various component parts and operate upon them in such manner as to more securely connect the parts together and thereby to provide an improved device. With these objects in view the invention consists in the various steps hereinafter fully described and set forth in the appended claims.

In the drawings forming a part of this specification Fig. 1 is a view of a tire carrying rim constructed in accordance with my invention, said rim being shown as applied to a fixed rim of the channeled sheet metal type; Fig. 2 is a detail perspective view of the lug ready to be brought into engagement with the perforated or apertured rim; Fig. 3 is a detail perspective view of the lug after the same has been brought into engagement with the rim and after the studs of the lug have been transversely split; Fig. 4 is a detail perspective view showing the split studs flattened out to complete the connection between the lug and rim base; Fig. 5 is an inverted perspective view of the tool or die for splitting the studs; Fig. 6 is a detail sectional view showing the studs split and riveted to the rim base; Fig. 7 is a detail perspective view of a modified form of stud carried by the lug, said studs being transversely split; Fig. 8 is a detail sectional view of such modified form of studs connected to the rim base; and Fig. 9 is a transverse sectional view showing such modified form of lug attached to the rim base.

In carrying out my invention I first roll a demountable tire carrying rim A which may be of the clencher or straight side type as preferred and this rim is shaped into a true circle and size to fit a definite size of wheel body. This rim A is preferably formed with an inrolled bead A' but instead of the inrolled bead there may be an inwardly extending rib or the rim base may be flat. The demountable tire carrying rim A has a series of lugs B permanently connected thereto and this invention pertains particularly to the special manner of connecting these lugs to the rim base. Each lug is substantially right angular in shape, one leg thereof being secured in engagement with the base of the rim while the other leg thereof projects inwardly and is apertured to receive the fastening bolt and each lug when completed is provided with one or more outwardly projecting studs B' which serve as rivets for the attachment of the lug to the rim base. The rim has a series of openings C punched therein adjacent the outer side and when an inrolled bead is formed in the base of the rim these openings C are produced in the inrolled bead and when an inwardly projecting rib is provided these openings are produced in said rim and when a flat rim base is made these openings C are produced in the base at substantially the same point as occupied by the inwardly projecting bead or rib and inasmuch as each lug is preferably provided with two outwardly projecting studs the openings or perforations will be so spaced apart as to receive said outwardly projecting studs in pairs.

The finished lugs are placed in engagement with the rim base or at least one member thereof is so placed, and the outwardly projecting studs B' pass through the openings or perforations C and these outwardly projecting studs are then split transversely at B² by means of the blade portions B³ of the tool or die B⁴ and after these studs have been thus transversely split they are flattened out longitudinally as most clearly shown in Fig. 4 thereby causing the riveted or flattened portions to be forced into the inrolled bead and fill or partially fill the same at these points. The lugs are preferably constructed from a bar or hot rolled section in the manner described in my previous application. In Fig. 7 I have shown a slight modification in which the studs B⁵ are formed with reduced ends B⁶ and these reduced ends B⁶ are transversely split as shown at B² in exactly the same manner. The studs B⁵ are somewhat wider than the studs B' and consequently the openings or perforations in the rim base will be correspondingly larger than those punched to receive the studs B' but the reduced ends B⁶ will be sufficient when split transversely and spread longitudinally to effect a rigid and safe connection between the rim base and lug.

I have found that by splitting the ends of the studs transversely and spreading them longitudinally into the inrolled bead or upon the outer face of the rim base that the riveting or upsetting operation can be more quickly and safely accomplished and the lugs less liable to be broken from the rim base by any sudden or severe blow or strain.

It will thus be seen that I provide a novel construction of rim and the method of connecting the fastening means thereto.

Having thus described my invention, what I claim is:

1. The method of making tire carrying rims of the attached lug type comprising perforating at intervals the base of a rim, bringing a lug having outwardly projecting studs into engagement with the inner face of said rim with the studs projecting through perforations in the rim base, splitting the projecting ends of said studs along lines transverse with respect to the rim, and then flattening out the split portions into binding engagement with the adjacent portions of the rim base.

2. The method of making tire carrying rims of the attached lug type comprising forming perforations at intervals in the inrolled bead formed in the base of a rim, bringing a lug having outwardly projecting studs into engagement with the inner face of said rim with the studs projecting through perforations in said bead, splitting the projecting ends of said studs along lines transverse with respect to the rim, and then flattening out the split portions into binding engagement with adjacent portions of the rim base and bead.

3. The method of making tire carrying rims of the attached lug type comprising the providing of a rim base having perforations therein and lugs having one or more outwardly projecting studs, the outer ends of said studs being reduced or shouldered and the unreduced portion of said studs being substantially equal to the thickness of the stock of the rim base, bringing said lugs into engagement with the inner face of said rim with the studs projecting through the perforations in the rim base, splitting the projecting reduced ends of said studs along lines transverse with respect to the rim, and then flattening out the split portions into binding engagement with adjacent portions of the rim base.

In testimony whereof, I hereunto affix my signature.

JAMES H. WAGENHORST.